United States Patent
Krauss et al.

[15] 3,664,489
[45] May 23, 1972

[54] APPARATUS AND METHOD FOR ALIGNING BELT CONVEYOR COMPONENTS SUCH AS IDLER FRAMES AND PULLEYS

[72] Inventors: Walter Francis Henry Krauss, 66 The Boulevard, Ivanhoe, Victoria, Australia; Norman Ernest Westmore, deceased, late of 31 Third Street, Black Rock, Victoria, Australia by Anna Mira Westmore, executrix

[22] Filed: Jan. 27, 1971

[21] Appl. No.: 110,239

[52] U.S. Cl. ................................................198/192
[51] Int. Cl. .....................................................B65g 13/11
[58] Field of Search ..............356/172; 198/1, 192; 356/150

[56] References Cited

UNITED STATES PATENTS 3,518,005  6/1970  Weber .............................356/172 X
940,329  11/1909  Krell ..................................356/150

*Primary Examiner*—Richard E. Aegerter
*Assistant Examiner*—Douglas D. Watts
*Attorney*—Robert E. Burns

[57] ABSTRACT

Apparatus and method of aligning idler frames of a belt conveyor. An optical square and a first line of sight indicator are mounted on the respective idler frame. The optical square provides a direct line of sight and an indirect line of sight perpendicular to the direct line of sight. One of the lines of sight extends along the idler frame and the other extends along the conveyor. A second line of sight indicator is located at a position along the conveyor from the idler frame and is displaced from the center line of the conveyor to the same extent as the optical square. The two sight indicators are then viewed through the optical square and the idler frame moved to bring them into apparent alignment.

12 Claims, 16 Drawing Figures

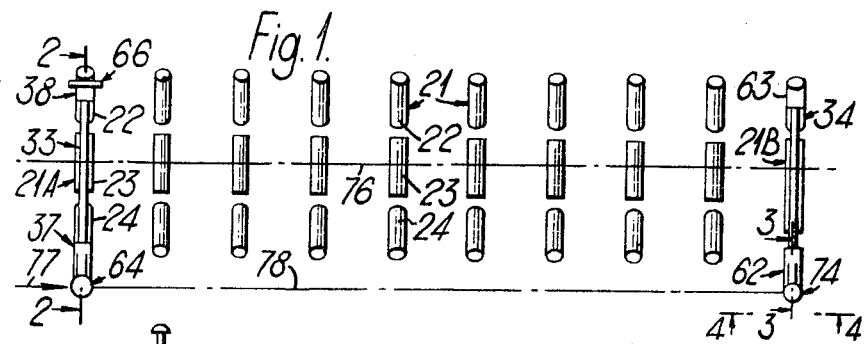
Fig. 1.
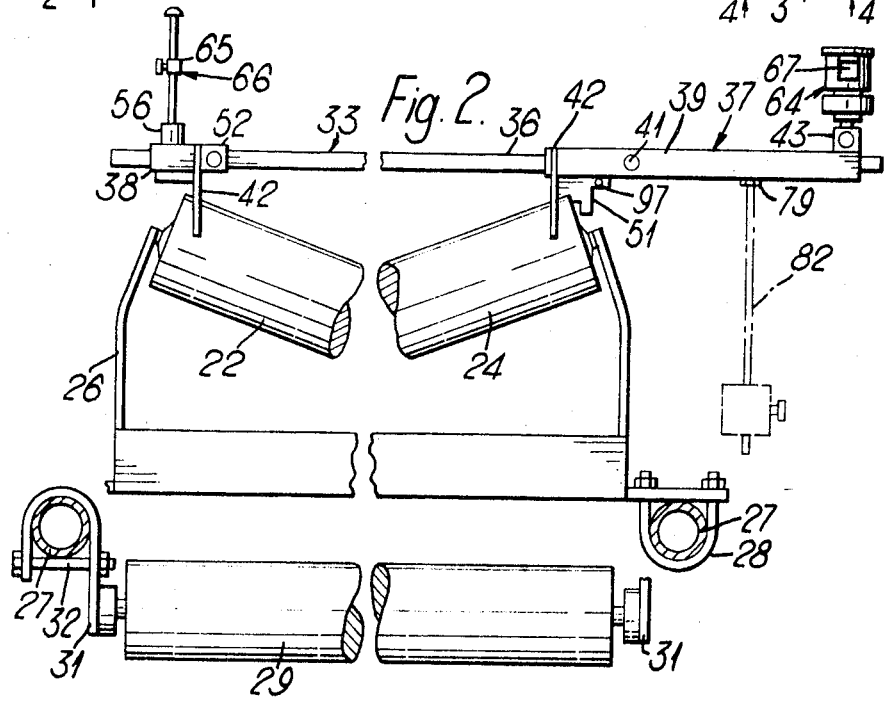
Fig. 2.
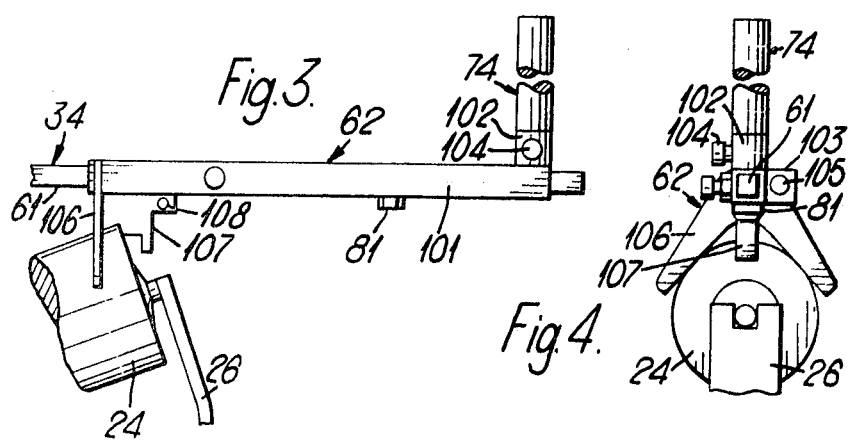
Fig. 3.
Fig. 4.

PATENTED MAY 23 1972  3,664,489

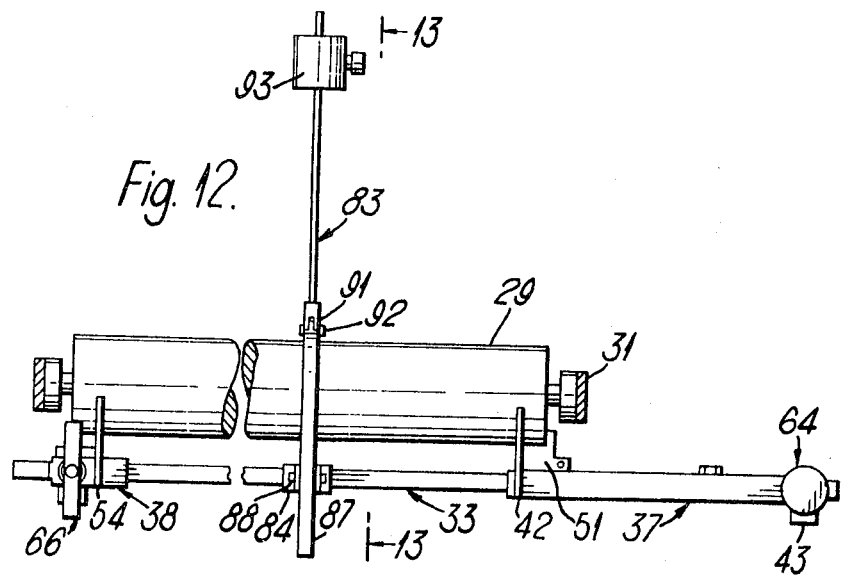
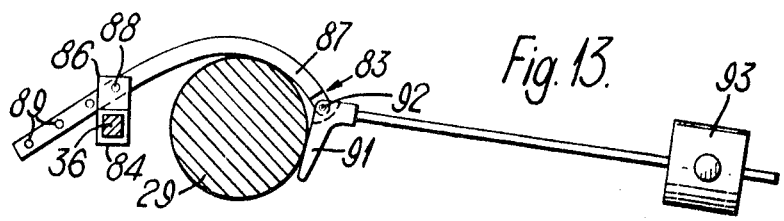
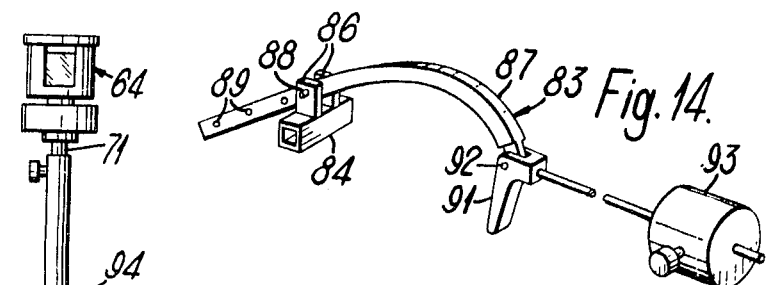
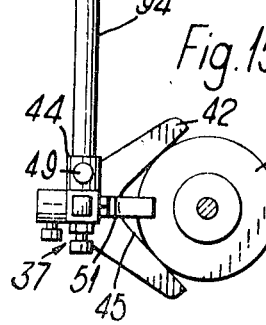

APPARATUS AND METHOD FOR ALIGNING BELT CONVEYOR COMPONENTS SUCH AS IDLER FRAMES AND PULLEYS

BACKGROUND OF INVENTION

1. Field of Invention

This invention relates to belt conveyors and is concerned particularly with the alignment of the idler frames and the pulleys of such conveyors.

As used herein, the term "idler" is to be construed as meaning one or more idler rollers carried in a frame or brackets. In many belt conveyors, the idlers supporting the loaded conveyor runs each comprise a set of one or more idler rollers mounted in a frame in a flat or trough formation, and idlers supporting the return run, generally comprise one or two rollers only. The term "pulley" is to be construed as meaning any of the rotating drums around which the conveyor belt is deviated in direction.

2. Prior Art

The idler frames and pulleys of belt conveyors are usually connected to stringers by means of bolts passing through slotted holes in the stringers to allow "cutting" of the idlers and pulleys for belt training purposes. After initial erection of the conveyor, the belt is run and the idlers moved to cause the belt to run truly. With this method, idlers may be cut in one direction to counteract the effect of idlers initially misaligned in the other direction, and the result may be no better than a balanced misalignment of idlers. This can cause an appreciable increase in friction and unnecessary wear on the belt. Furthermore, the effect of idler cut in one direction may exactly counteract the number cut in the other direction for one set of conditions only. If these conditions change in service the belt may again fail to run truly.

When balance is disturbed for some reason, there is a tendency for further cutting to be done to correct it, possibly with different operators cutting different idlers until a state of disorder is reached when it becomes necessary to carry out a complete re-alignment of idlers.

If all of the idler frames and pulleys could be properly squared, the belt would run truly under all conditions but at the present time there is no satisfactory method of doing this. The present invention provides a simple apparatus and method which allows idler frames and pulleys to be quickly squared with sufficient accuracy to cause the belt to continue to run truly under variable operating conditions.

SUMMARY

According to the invention there is provided apparatus for aligning idler frames or pulleys of a belt conveyor, comprising a pair of rods one of which carries at longitudinal spacing an optical square and a first line of sight indicator and the other of which carries a second line of sight indicator, wherein the optical square is viewable so as to provide a direct line of sight and an indirect line of sight perpendicular to the direct line of sight with one of said lines of sight extending longitudinally of the rod to said first line of sight indicator.

Preferably, the optical square is oriented for viewing in a direction perpendicular to said one rod such that the indirect line of sight is said one line of sight.

Preferably too, the first line of sight indicator is a marking on a graduated scale mounted on said one rod and the second line of sight indicator is a sighting bar extending perpendicularly from said other rod.

Preferably further, each rod is provided with a pair of longitudinally spaced seating members which can be engaged with a roller or rollers of an idler to align the rod with the idler frame.

Preferably further, both of said rods are provided with stop means which, after the rods have been aligned with a pair of spaced idler frames, can be engaged with those idler frames or rollers therein or pulleys to set the optical square and the sighting bar at equal distances from the center line of the conveyor.

The invention also provides a method of aligning an idler frame of a belt conveyor, comprising locating an optical square and a first line of sight indicator in alignment with said idler frame so as to be movable with that frame, the optical square being oriented for viewing such as to provide a direct line of sight and an indirect line of sight perpendicular to the direct line of sight with one of said lines of sight extending in a direction along the idler frame and the other of said lines of sight extending along the conveyor, locating a second line of sight indicator at a position which is along the conveyor from said idler frame and is displaced from the center line of the conveyor to the same extent as the optical square, viewing the first and second line of sight indicators through the optical square, and moving the idler frame to bring the first and second line of sight indicators into apparent alignment.

In order that the invention may be more fully explained, one form of apparatus constructed in accordance therewith, and the manner in which it is used, will now be described in detail with reference to the accompanying drawings.

BRIEF DESCRIPTION OF DRAWINGS

FIG. 1 is a somewhat diagrammatic plan of a number of conveyor belt idlers 21 to a pair 21A, 21B of which is fitted an aligning apparatus in accordance with the invention;

FIG. 2 is a view on the line 2—2 in FIG. 1 and shows that part of the aligning apparatus which is fitted to idler 21A;

FIG. 3 is a view on the line 3—3 in FIG. 1;

FIG. 4 is a view on the line 4—4 in FIG. 1;

FIG. 12 is a plan of part of the aligning apparatus fitted to the side of a return idler roller with the aid of a clamping attachment;

FIG. 13 is a view on the line 13—13 in FIG. 12;

FIG. 14 is a perspective view of the clamping attachment of FIGS. 12 and 13;

FIG. 15 is an end elevation of an arrangement similar to that shown in FIG. 12 but without the clamping attachment and modified by the incorporation of an extension tube; and FIG. 16 is a perspective view of the extension tube of FIG. 15.

DESCRIPTION OF PREFERRED EMBODIMENTS

Figure 5:
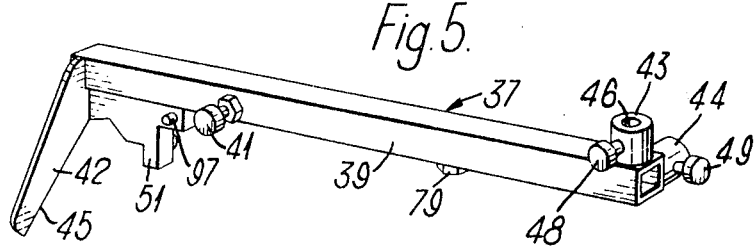
FIGS. 5, 6, 7 and 8 are perspective views of various components of the aligning apparatus.

Idlers 21 are conventional troughing idlers arranged to support the loaded run of the conveyor belt. Each idler comprises three idler rollers 22, 23, 24 mounted in an idler frame 16 in a shallow trough formation. Idler frames 26 are connected to a pair of longitudinal tubular stringers 27 be means of V-shaped bolts 28 which pass around the stringers and are fitted through slotted holes in the idler frames to allow "cutting" of the idlers for belt training purposes.

A number of idler rollers 29 are provided to guide the return run of the conveyor belt. These return run idlers are mounted between a pair of hooked brackets 31 hung from stringers 27 and fastened to the stringers by means of bolts 32 so that they too can be "cut" for belt training purposes.

The aligning apparatus constructed in accordance with the invention comprises a pair of aligning rods denoted generally as 33, 34. As shown in FIG. 1, aligning rod 33 is fitted to idler 21A and aligning rod 34 is fitted to idler 21B. The construction of the two aligning rods is very similar and rod 33 will be described first.

Figure 6:
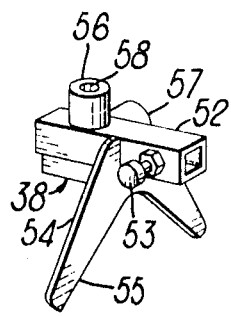
Figure 7:
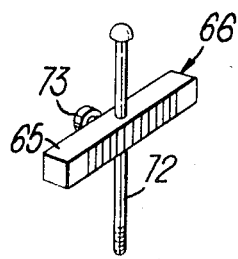
Figure 8:
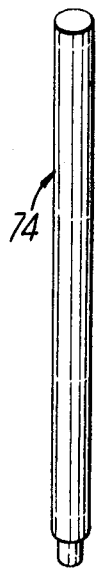

Aligning rod 33 comprises a length of square tubing 36 fitted with end pieces 37, 38 perspective views of which are shown in FIGS. 5 and 6. End piece 37 comprises a long collar 39 of square tubing which is a sliding fit on tubing 36 and is clamped thereto by means of a grub screw 41. One end of collar 39 is fitted with a plate 42 which is generally V-shaped so as to define a V-shaped notch 45 therein and which lies in a plane perpendicular to the axis of the aligning rod. The other end of the collar is provided with a pair of spigots 43, 44 having cylindrical sockets 46, 47 lying on two mutually perpendicular axes and a pair of grub screws 48, 49. Adjacent V-shaped plate 42, end piece 37 is also provided with a notched stop plate 51 the purpose of which will be hereinafter explained.

End piece 38 comprises a relatively short collar 52 which is a sliding fit on tubing 36 and is clamped thereto by means of a grub screw 53. One end of collar 52 is provided with a substantially V-shaped plate 54 which is identical to plate 42. This plate defines a V-shaped notch 55 and lies in a plane perpendicular to the axis of the aligning rod. The other end of collar 52 is provided with a pair of spigots 56, 57 having internally tapped sockets 58, 59 disposed about two mutually perpendicular axes.

Aligning rod 34 comprises a length of square tubing 61 and a pair of end pieces 62, 63 which are respectively identical to tubing 36 and end pieces 37, 38 of aligning rod 33. End piece 62 comprises a collar 101, socketed spigots 102, 103 fitted with grub screws 104, 105, a V-shaped plate 106 and a stop plate 107.

Aligning rod 33 is aligned with idler 21A simply by engaging the V-shaped notches of plates 42, 54 on its end pieces 37, 38 with the outer two idler rollers 22, 24 of that idler. The rod centers itself on these outer two rollers and takes up the alignment of the idler frame 26 (provided, of course, that the idler has been manufactured with the individual rollers in line with one another and with the two outer rollers 22, 24 having equal "lead" angles).

Aligning rod 33 carries an optical square 64 at one end and at the other a graduated scale 66 formed by markings on a block 65. Optical square 64 is of conventional construction comprising a pentaprism 67 disposed within a casing 68 which is provided with a window 70 and is mounted on a base 69. Base 69 has a downwardly depending peg 71 which fits into socket 46 of spigot 43 and is clamped by grub screw 48. Scale 66 is mounted on a bolt 72 screwed into tapped socket 58. It can be slid along the bolt for height adjustment and clamped in position by means of a grub screw 73. The optical square is oriented for viewing in a direction perpendicular to rod 33 so that it provides a direct line of sight perpendicular to the rod and an indirect line of sight along the rod and to the scale.

End piece 62 of aligning rod 34 is fitted with a sighting stick 74. The lower end of sighting stick 74 fits into the socket in spigot 102 and is clamped by grub screw 104.

Aligning rod 34 is aligned with idler 21B in similar fashion to the manner in which rod 35 is aligned with idler 21A, i.e. simply by engaging its V-shaped plates with the outermost pair of rollers of the idler. Since end pieces 39 and 62 are identical, the distance between stop plate 51 and the vertical axis of optical square 67 is exactly equal to the distance between the vertical axis of sighting stick 74 and stop plate 107 of end piece 62. Thus by moving rods 33, 34 longitudinally of idlers 21A, 21B until their stop plates engage the end rollers 34 of those idlers, sighting stick 74 and optical square 67 can be located at exactly the same distance from the end rollers of their respective idlers and therefore at equal displacements from the center line 76 of the conveyor. The lower edges of the stop plates are cut to a profile such that they can be engaged with idler rollers at any diameter.

Figure 9:
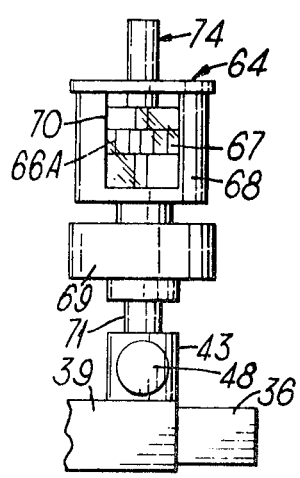
FIG. 9 is an enlarged view of part of the aligning apparatus fitted to idler 21A.

In order to align idlers 21A and 21B, sighting stick 74 and scale 66 are viewed simultaneously through the optical square from the direction shown by arrow 77 in FIG. 1. The direct line of sight 78 between optical square 67 and sighting stick 74 is parallel to the center line of the conveyor so that, if idler 21A supporting the optical square is truly square to the conveyor center line, the reflected image 66A of the scale seen through the optical square, will centralize on the image 74A of the sighting stick as shown in FIG. 9. If the frame of idler 21A is misaligned, the degree of misalignment can be read from the scale. Idler 21A can then be moved until the reflected image of the scale is centralized on the sighting stick and the idler frame is truly square to the conveyor center line. The two aligning rods 33, 34 can then be moved in steps along the conveyor successively to align each of the idlers 21.

In cases where the outer rollers 22, 24 of idlers 21 have substantial inclination, the frictional grip of the V-shaped plates of the aligning rods on these rollers is sufficient to prevent the aligning rods from rotating and upsetting the lines of sight of the optical square and the alignment of the sighting stick. However, if the apparatus is being used to align idlers which have shallow troughs or idlers with no troughs at all, pendulum arms may be screwed into a pair of nuts 79, 81 welded to end pieces 37, 62 FIG. 2 shows in phantom a suitable pendulum arm 82 screwed into nut 79 to prevent rotation of aligning rod 33.

In order to align the return idler rollers 29, rods 33, 34 may have to be placed against the sides of these rollers instead of resting on the top of them. In this case, each rod may be fitted with a clamping attachment 83 as shown in FIGS. 12 to 14. FIG. 12 shows the aligning rod 33 against the side of a return idler roller 29. Optical square 67 is re-located by fitting its base peg 71 in socket 47 of spigot 44 and the scale bolt 72 is removed from tapped socket 58 and refitted into socket 59 of spigot 57 so that the optical square and the scale are both located directly above the rod.

Clamping attachment 83 comprises a short collar 84 of square tubing which can be slidably mounted on the rod and is provided with a pair of upstanding drilled lugs 86 between which a clamp arm 87 is pivotally mounted by means of a pivot pin 88. Arm 87 has a straight shank and a curved end and the shank is provided with a number of spaced holes 89, the arm being pivotally connected between lugs 86 by inserting pin 88 through one of these holes. The particular hole is selected according to the diameter of roller 29 so that the arm extends over the top of the roller and curves downwardly around it. A cranked finger 91 is pivotally connected to the curved end of clamp arm 87 by a pivot pin 92 and carries a counterweight 93 which presses it against the roller so that the roller is gripped firmly between the V-shaped plates 42, 54 and cranked finger 91. Thus, by means of clamping attachment 83, the aligning rod may be held to one side of the return idler roller 29. The rod is aligned with the idler frame by the engagement of the roller with the two V-shaped plates and is set longitudinally of the idler frame by the engagement of its stop plate 51 with the roller.

When setting either rod 33 or rod 34 to the side of a roller as shown in FIG. 12, it may be desirable to increase the height of the optical square and the square above rod 33 and to appropriately lift sighting stick 74 on rod 34. This may be simply achieved by means of three identical extension tubes 94 one of which is illustrated in FIG. 16. FIG. 15 shows the manner in which one of these tubes may be fitted between the optical square 64 and spigot 44 of rod 33 and it will be obvious how the other two tubes may be used to lift the scale and the sighting stick.

Figure 10:
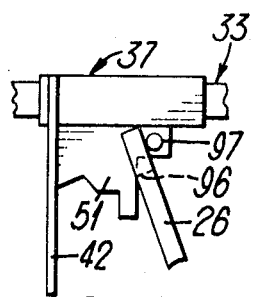
FIG. 10 is a scrap view showing the manner in which the aligning apparatus can be fitted to the frames of the idlers before the idler rollers are installed.
Figure 11:
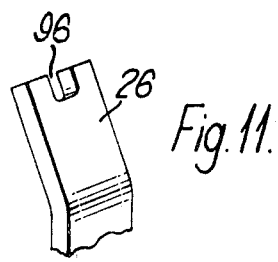
FIG. 11 is a scrap perspective view of part of an idler frame.

The illustrated aligning apparatus can also be employed to align idler frames 26 before they are fitted with rollers. This may be by resting the rods across the frames with their stop plates engaging the slots cut in the frames to receive the axles of the outer rollers. FIG. 11 shows part of one of the idler frames 26 and a slot 96 which is cut in it to receive the axle of its idler roller 24. As shown in FIG. 10, end piece 37 of aligning rod 33 can be rested on the frame with its stop plate 51 engaging slot 96. The stop plate is provided with a locating pin 97 which can be engaged with the idler frame 26 accurately to set the optical square a fixed distance from the conveyor center line. Stop plate 107 of aligning rod 34 is provided with an identical locating pin 108 and by pushing the aligning rods so that both pins are hard against the frames, the optical square and the sighting stick can be accurately located at the same distance from the conveyor center line.

In some circumstances, it may not be convenient to view the optical square from the direction of arrow 77 and it may be preferable to turn the optical square through 90° so that it can be viewed from a location beyond the end of idler 21A to provide a direct line of sight to the graduated scale and an indirect line of sight to the sighting stick 74.

The use of the above described apparatus allows idlers to be readily set truly square to the center line of the conveyor. Great savings in installation time can therefore be achieved and maintenance due to misalignment of conveyors are greatly reduced. However, this particular form of apparatus has been described by way of example only and many modifications may be made thereto in order to suit particular applications. For example, in order to align very large diameter rollers or head pulleys of a conveyor, the rods may be provided with magnetic attachments to engage the ends of the rollers instead of using V-shaped plates. The optical square need not, of course, be of the pentaprism type but may be any one of a variety of conventional types. It could, for example, be of the type comprised of a plurality of plane mirrors angled to one another. It is therefore to be understood that the invention is in no way limited to the constructional details and the various methods of operation particularly described herein but includes all variations and departures therefrom falling within the scope of the appended claims.

We claim:

1. Apparatus for aligning idler frames or pulleys of a belt conveyor, comprising a pair of rods one of which carries at longitudinal spacing an optical square and a first line of sight indicator and the other of which carries a second line of sight indicator, wherein the optical square is viewable so as to provide a direct line of sight and an indirect line of sight perpendicular to the direct line of sight with one of said lines of sight extending longitudinally of the rod to said first line of sight indicator.

2. Apparatus as claimed in claim 1, in which the first line of sight indicator is a marking on a graduated scale mounted on said one rod and the second line of sight indicator is a sighting bar extending perpendicularly from said other rod.

3. Apparatus as claimed in claim 1, in which each rod is provided with a pair of longitudinally spaced seating members which can be engaged with a roller or rollers of an idler to align the rod with the frame of the idler.

4. Apparatus as claimed in claim 3, in which each seating member comprises a plate disposed in a plane perpendicular to the axis of its associated rod and provided with a generally V-shaped notch for engagement with said roller or rollers.

5. Apparatus as claimed in claim 3, which further comprises a clamp attachment attachable to either rod and operable against said roller or one of said rollers to draw the seating members of that rod into firm engagement with said roller or rollers thereby to hold the rod in position.

6. Apparatus as claimed in claim 5, in which said clamping attachment comprises an arm pivotally connectable with either rod and a cranked finger pivotally connected to the end of said arm and provided with a counterweight.

7. Apparatus as claimed in claim 1, in which both of said rods are provided with stop means which, after the rods have been aligned with a pair of spaced idler frames, can be engaged with those idler frames or rollers therein to set the optical square and the second line of sight indicator at equal distances from the center line of the conveyor.

8. Apparatus as claimed in claim 7, in which the stop means of each rod comprises a stop plate disposed in a plane extending longitudinally of the rod.

9. Apparatus as claimed in claim 8, in which the stop means of each rod also comprises a pin extending laterally from said stop plate.

10. Apparatus as claimed in claim 1 in which the optical square is oriented for viewing in a direction perpendicular to said one rod such that the indirect line of sight is said one line of sight.

11. A method of aligning an idler frame of a belt conveyor, comprising locating an optical square and a first line of sight indicator in alignment with said idler frame so as to be movable with that frame, the optical square being oriented for viewing such as to provide a direct line of sight and an indirect line of sight perpendicular to the direct line of sight with one of said lines of sight extending in a direction along the idler frame and the other of said lines of sight extending along the conveyor, locating a second line of sight indicator at a position which is along the conveyor from said idler frame and is displaced from the center line of the conveyor to the same extent as the optical square, viewing the first and second line of sight indicators through the optical square, and moving the idler frame to being the first and second line of sight indicators into apparent alignment.

12. A method as claimed in claim 11, in which the optical square is oriented for viewing in a direction along the conveyor so that the indirect line of sight is said one line of sight and the direct line of sight is said other line of sight.

* * * * *